United States Patent [19]

Geiger et al.

[11] Patent Number: 5,449,992
[45] Date of Patent: Sep. 12, 1995

[54] BRAKING CIRCUIT FOR AN ELECTRIC MOTOR

[75] Inventors: August Geiger, Talheim; Alexander Knappe; Michael Bufe, both of Rietheim, all of Germany

[73] Assignee: Marquardt GmbH, Rietheim, Germany

[21] Appl. No.: 125,864

[22] Filed: Sep. 24, 1993

[30] Foreign Application Priority Data

Sep. 26, 1992 [DE] Germany .................. 42 32 402.5

[51] Int. Cl.$^6$ .............................................. H02K 7/10
[52] U.S. Cl. ................................. 318/362; 318/757; 318/375; 318/364; 318/365; 318/381
[58] Field of Search ............... 318/757, 375, 362, 364, 318/365, 375, 381

[56] References Cited

U.S. PATENT DOCUMENTS

| | | |
|---|---|---|
| 2,432,682 | 12/1947 | Robson . |
| 3,628,112 | 12/1971 | Gross et al. . |
| 3,673,481 | 6/1972 | Hardin ............... 318/375 X |
| 3,970,807 | 7/1976 | Schaffeler et al. . |
| 4,145,640 | 3/1979 | Kipp et al. ................ 318/375 |
| 4,241,302 | 12/1980 | Benjamin ............... 318/757 X |
| 4,442,363 | 4/1984 | Suzuki . |
| 4,878,000 | 8/1989 | Chen . |
| 5,099,184 | 3/1992 | Horning et al. ............ 318/375 |
| 5,294,874 | 3/1994 | Hessenberger et al. ...... 318/375 X |

FOREIGN PATENT DOCUMENTS

| | | |
|---|---|---|
| 1001746 | 1/1957 | Germany . |
| 2002768 | 11/1970 | Germany . |
| 3539841A1 | 3/1987 | Germany . |
| 3636555A1 | 5/1988 | Germany . |
| 3511893C2 | 10/1989 | Germany . |
| 4021319A1 | 1/1992 | Germany . |
| 4022637A1 | 1/1992 | Germany . |
| 3546719C2 | 5/1992 | Germany . |
| 4038786A1 | 6/1992 | Germany . |

Primary Examiner—William M. Shoop, Jr.
Assistant Examiner—Karen Masih
Attorney, Agent, or Firm—Spencer, Frank & Schneider

[57] ABSTRACT

A braking circuit for an electric motor includes a braking device for being connected in a circuit for braking the electric motor, a braking switch including first and second changeover switches for switching between a motor mode and a braking mode, and a control device. Switching contacts of the first and second changeover switches are switched between a first position for contacting, respectively, first stationary contacts of the first and second changeover switches in the motor mode, and a second position for contacting, respectively, second stationary contacts of the first and second changeover switches in the braking mode. The control device is coupled to the first and second changeover switches for controlling the switching between the motor mode to the braking mode so that when switching between motor mode to the braking mode, the switching movement of first changeover switch, which is closest to the power supply, is delayed with respect to the switching movement of the second changeover switch, and when switching from the braking mode to the motor mode, the changeover switches move essentially synchronously and simultaneously.

15 Claims, 10 Drawing Sheets

BRAKING CIRCUIT FOR AN ELECTRIC MOTOR

BACKGROUND OF THE INVENTION

1. Field of the Invention

The invention relates to a braking circuit for an electric motor, especially for driving electric hand-tools such as drills, angle grinders, hedge trimmers and the like, having a braking switch, and to an electrical switch, which is suitable for use in the braking circuit, having at least two contact systems which are constructed as changeover switches.

2. Description of the Related Art

Electric motors have a relatively long running-on time after the power supply voltage has been switched off, as a result of their kinetic energy. Particularly when used in electric hand-tools, such as angle grinders, chainsaws, electric planes and the like, because of the possible risk of injury to the operator it is desirable to ensure rapid braking of the electric motor, and hence of the electric hand-tool, when the electric motor is switched off. The electric motor is normally braked by means of a braking circuit in which the armature and the field winding are switched into a braking circuit during switching off, that is to say when switching over from the motor mode to the braking mode. The kinetic energy is then converted into heat in the braking circuit,-.and emitted to the surrounding air.

DE-PS 35 46 719 discloses such a braking circuit for a universal electric motor, in the case of which a braking circuit is formed by the electric motor armature being short-circuited via the field in the switched-off state. For this purpose, a braking switch comprising two changeover switches S1, S2 is provided the connections for the switching contacts of which braking switch are connected to the two connections of the field winding. The connections of the stationary contacts of the two changeover switches S1, S2 are connected to one power supply terminal and to the two sides of the armature winding such that, when the electric motor is in the switched-off state, the polarity of the armature winding with respect to the field winding is the opposite of that when the electric motor is in the switched-on state.

In order to prevent the contacts of the braking switch from being destroyed as a result of high currents in the braking circuit when the electric motor is being switched off, or as a result of power supply short-circuits, it is proposed that the switching processes in the braking switch take place in a time-delayed manner. When switching over from the motor mode to the braking mode, the changeover switch S1, which is close to the power supply, is operated first and then the changeover switch S2 which is remote from the power supply is operated. When switching over from the braking mode to the motor mode, the changeover switch S2 which is remote from the power supply is operated first, and then the changeover switch S1 which is close to the power supply is operated.

Furthermore, electronic circuits are known which are arranged in the braking current path of the braking circuit and are used for controlling the braking of the electric motor. Such braking electronics are disclosed, for example, in DE-OS 3,539,841, DE-OS 3,636,555 and DE-OS 4,022,637. However, no more precise statements are made in these Laid-Open Specifications with respect to the braking switch, which once again comprises two changeover switches, and, in particular, to the sequence of the switching processes of the two changeover switches.

It has been found that, in the case, of a braking circuit having a braking switch of the specified type, failures can occur in the braking when switching over from the motor mode to the braking mode, especially when using braking electronics. In such a case, the electric motor then runs on without being braked. It can immediately be seen that, just for safety reasons, such a circuit, having a braking switch in which there is no absolute guarantee of a fault-free braking behavior, is unsuitable as a braking circuit.

It has furthermore been found that the braking switch described in DE-PS 3,546,719 has a tendency to have failures resulting from contact erosion after only a short operating period. Particularly when used on electric motors of relatively high power, for example over 1200 W, the contacts weld within a very short time and the braking switch becomes unusable. Even if switching operations from the braking mode directly back to the motor mode are made frequently, without waiting for the motor to stop, this problem occurs to a considerable extent.

SUMMARY OF THE INVENTION

The invention is based on the object of creating an operationally reliable braking circuit and a braking switch which is suitable for use in this braking circuit, so that there is no need to worry about premature destruction of the braking switch even in the case of electric motors of relatively high power. In particular, the braking circuit and the braking switch are also intended to be suitable for use with braking electronics.

This object is achieved in the case of a braking circuit for an electric motor having an armature winding and a field winding, the field winding having a first terminal for connection to a power supply terminal, and a second terminal, the braking circuit including a braking device, a braking switch and a control device. The braking device includes first and second connections for being connected in a circuit for braking the electric motor. The braking switch includes first and second changeover switches for switching between a motor mode and a braking mode. The first changeover switch includes a first stationary contact connected to the power supply terminal, a second stationary contact coupled to the first connection of the braking circuit and a switching contact connected to the first terminal of the field winding and being switchable between the first and second stationary contacts of the first changeover switch. The second changeover switch includes a first stationary contact coupled to the armature, a second stationary contact connected to the second connection of the braking circuit and a switching contact connected to the second terminal of the field winding and being switchable between the first and second stationary contacts of the second changeover switch.. The switching contacts of the first and second changeover switches are switched between (1) a first position for contacting, respectively, the first stationary contacts of the first and second changeover switches in the motor mode for connecting the field winding and the armature in series with the power supply terminal to form a motor circuit, and (2) a second position for contacting, respectively, the second stationary contacts of the first and second changeover switches in the braking mode for connecting the field winding and the armature winding in the circuit with the braking device to form a closed braking circuit. The control device is coupled to the first and second changeover switches for controlling the switching between the motor mode to the braking mode so that when the braking switch switches from the motor mode to the braking mode, the switching of the first changeover switch from its first position to its second position is delayed with respect to the switching of the second changeover switch from its first position to its second position for switching on the braking circuit later upon the switching of the first changeover switch to its second position., and when the braking switch switches from the braking mode to the motor mode, the first and second changeover switches both switch from their second position to their first position substantially synchronously for switching the motor circuit on essentially simultaneously. In the case of an electrical switch, which is intended for use in the braking circuit, this object is achieved by means of the other features of the invention disclosed herein.

Further advantageous refinements of the invention are the subject matter of the subclaims.

The advantages which can be achieved by means of the invention are, in particular, that a braking circuit is specified which is very reliable. Danger to the user resulting from faulty braking can be precluded. The braking circuit according to the invention can be used universally and can also be used in the case of electric motors of relatively high power. Premature failures resulting from welding or contact erosion do not occur in the case of the braking switch. At the same time, overloading of the electric motor in the braking mode is avoided and a high level of protection of the electric motor is achieved which, in the end, leads to an increase in the life of the electric motor.

BRIEF DESCRIPTION OF THE DRAWINGS

An exemplary embodiment of the invention is described in more detail in the following text and is shown in the drawings, in which.

DETAILED DESCRIPTION OF THE PREFERRED EMBODIMENTS

Figure 1:
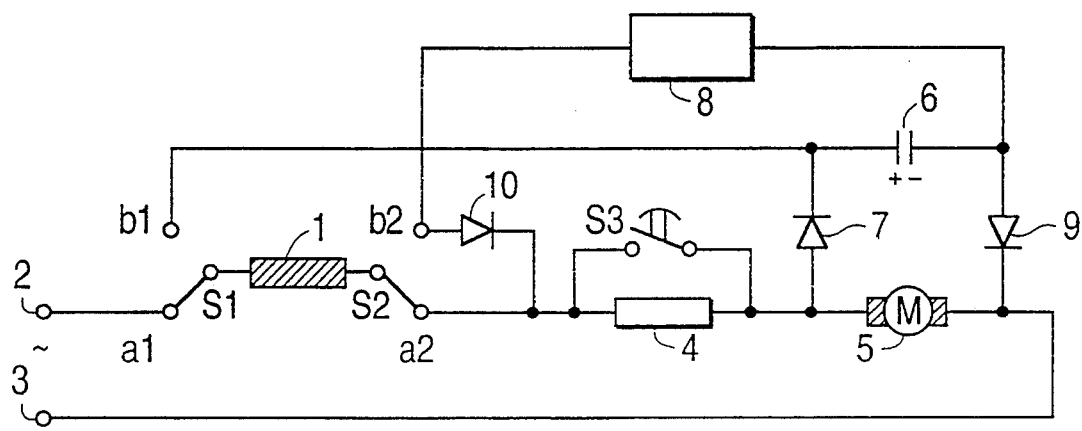
FIG. 1 shows the outline circuit diagram of a braking circuit having braking electronics for an electric motor with the switch in the position for the motor mode.

FIG. 1 shows the circuit of a universal electric motor, as is used for electric hand-tools, for example drills, angle grinders, electric planes, electric hedge-trimmers and the like, in the motor mode position.

The electric motor has a field winding 1 to whose connections two changeover switches S1 and S2 are connected. The changeover switch S1 switches over between two contacts a1, b1, the contact a1 representing the first connection to the motor circuit. This connection comprises the one connection 2 of the supply voltage which is formed by the AC voltage of the power supply. The other contact b1 represents the first connection of the braking circuit. The changeover switch S2 switches over between two contacts a2, b2, a2 similarly representing the second connection to the motor circuit and b2 the second connection of the braking circuit. In the present exemplary embodiment, the changeover switch S1 is thus the changeover switch which is close to the power supply, and the changeover switch S2 is the changeover switch which is remote from the power supply. The resistor 4, which can be bridged by means of a further switch S3, is connected to the contact a2 in the motor circuit. The armature winding 5 is then furthermore connected in series and the other connection 3 of the supply voltage is connected thereto. It is, of course, also possible to connect a further field winding between the armature winding 5 and connection 3 or between the first field winding 1 and the switch S2.

The following description of the operation of the circuit in the motor mode considers the positive half-cycle of the supply voltage originating from the connection 2. In the negative half-cycle, the current flows in the opposite direction, so that more detailed explanations of this are superfluous.

In the starting phase of the motor mode, the current flows from the connection 2 via the contact a1 of the changeover switch S1, the field winding 1 and the contact a2 of the changeover switch S2 to the resistor 4, since the switch S3 is still open. From there, the current flows on to the armature winding 5 and then finally to the connection 3 of the supply voltage. The resistor 4 is thus used in the starting phase as a series resistor for limiting the starting current. Once the starting phase has been completed, the switch S3 is closed and the resistor 4 is thus bridged, so that the current flows from the changeover switch S2 and the contact a2 directly into the armature winding 5 without being limited by the resistor 4.

A capacitor 6 is connected in parallel with the armature winding 5, via a diode 7. This capacitor 6 is used as a starting capacitor in order to initiate the braking mode, which is described in more detail in the following text. The cathode of the diode 7 is connected to the capacitor 6 so that, in the motor mode, the capacitor 6 is charged in the polarity shown in FIG. 1. The capacitor 6 is prevented from discharging again during the negative half-cycle of the supply voltage, by the diode 7.

Figure 2:
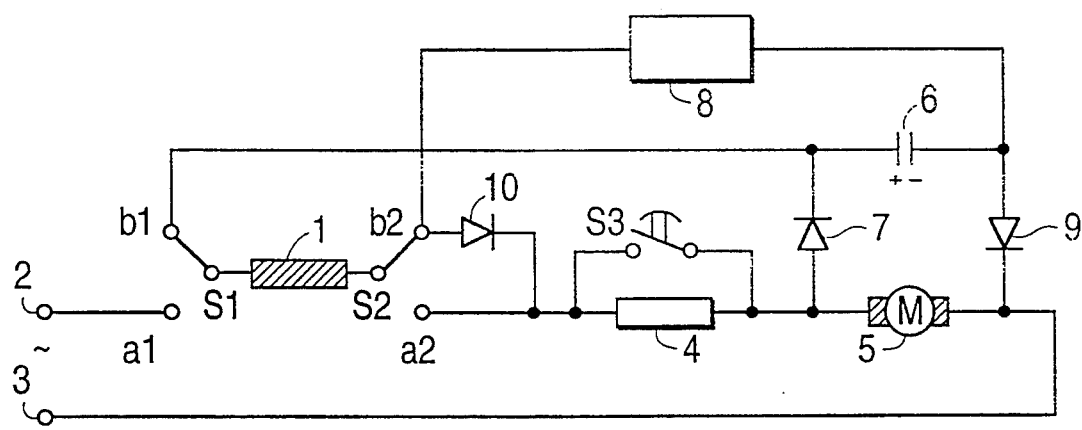
FIG. 2 shows the circuit diagram of a braking circuit according to FIG. 1 with the switch in the position for the braking mode.

If the two changeover switches S1 and S2 are switched to their contacts b1 and b2, then the field winding 1 and the armature winding 5 are in the braking circuit. In this position of the braking mode of the changeover switches S1 and S2, the electric motor acts as a generator. In this case, in the braking mode, the current flows through the field winding 1 and the armature winding 5 in the opposite direction while, in the motor mode, the current flows through the field winding 1 and the armature winding 5 in the same direction. Furthermore, in the braking mode, the switch S3 is also open, so that the resistor 4 is likewise in the braking circuit. Braking electronics 8 can possibly also be arranged in the braking circuit, as can be seen, in addition, in FIG. 2.

The capacitor 6 discharges immediately after switching over into the braking mode, a current flowing via the connection to the contact b1 of the changeover switch S1, through the field winding 1 and the changeover switch S2 to the contact b2. The current flows from there back to the capacitor, via the braking electronics 8. This results in the field winding 1 being excited with a specific polarity at the start of braking irrespective of the respective phase of the supply voltage, to be precise, even if the residual magnetism in the field winding 1 is no longer sufficient for excitation or is of incorrect polarity. The DC braking current produced as a result of the generator effect of the electric motor is then likewise of the correct polarity and then leads to further self-excitation of the field winding 1 in the said polarity with respect to the armature winding 5. Discharging of the capacitor 6 from the contact b2 via the resistor 4 and the armature winding 5, which can lead to a braking failure as a result of the direction in the armature winding 5 then being incorrect, is prevented by means of a diode 9 which is connected between the negative terminal of the capacitor 6 and the connection of the armature winding 5 remote from the resistor 4. For this purpose the anode of the diode 9 is connected to the capacitor 6.

After initiation of the self-excitation, a current flows from the armature winding 5 via the diode 7 to the contact b1, and from there via the changeover switch S1 into the field winding 1, as a result of the voltage, which is induced in the armature winding 5, of the electric motor which is acting as a generator.

Figure 4:
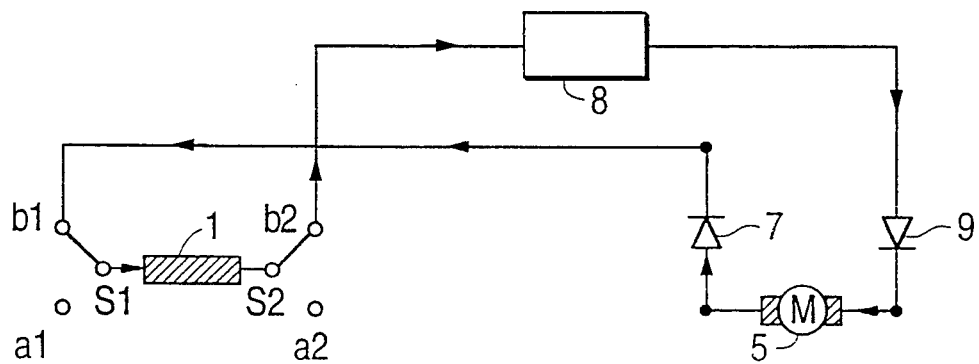
FIG. 4 shows the current flow in the braking circuit in the braking mode with the braking electronics active.

The current then flows from the field winding 1 via the changeover switch S2 to the contact b2, from there through the braking electronics 8, which are switched to be active, and then back to the armature winding 5. This first branch of the braking circuit in the braking mode is shown in more detail in FIG. 4, with the current flow direction. As can be seen there, the field winding 1 and the armature winding 5, are in the correct polarity, that is to say the current in the field winding 1 flows in the opposite direction to that in the armature winding 5, as is required in the generator mode.

Figure 3:
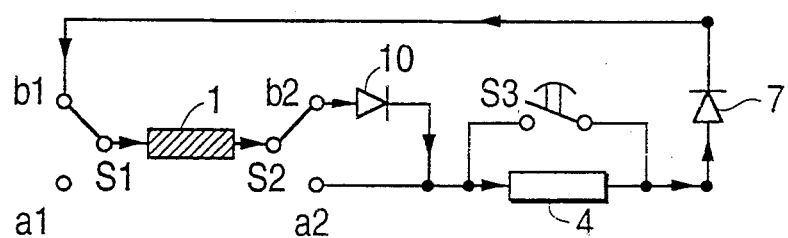
FIG. 3 shows the current flow in the braking circuit in the braking mode with the braking electronics inhibited.

The current in the field winding 1 rises more and more as a result of the generator effect. If it has reached a specific upper limit, then the braking electronics 8 are switched into the non-active state and are thus inhibited. The current at the contact b2 must therefore flow into the other second branch of the braking circuit, as is shown in more detail in FIG. 3. As can be seen there, the current then flows via the diode 10 through the resistor 4. From there, it flows on via the diode 7 to contact b1 and via the changeover switch S1 back into the field winding 1.

The diodes 7, 9 and 10 thus also ensure that the current in the respective branch of the braking circuit has the polarity required for the generator mode. The second branch of the braking circuit, through which the current flows when the braking electronics 8 are inhibited, is also called the freewheeling branch. The diodes 7 and 10, which are arranged in the freewheeling branch, are thus so-called freewheeling diodes.

Since the current in the freewheeling branch flows via the resistor 4, power is converted into heat there and the current decreases. The resistor 4 thus acts as a braking resistor in the braking mode when the electronics 8 are inhibited. If the current falls below a specific limit or, alternatively, a specified time window has elapsed, the braking electronics 8 are once again switched into the active state, so that the current once again flows in the first branch of the braking circuit. As a result of the self-excitation, the current in the braking circuit then rises again until the braking electronics 8 are once again inhibited.

The braking electronics 8 are thus switched between the active state and the non-active state, that is to say they operate in a pulsed manner, to be precise, as long as the kinetic energy of the electric motor is required because of the resistive losses in the braking circuit. This results on the one hand in very rapid braking of the electric motor while, however, on the other hand preventing excessively abrupt braking of the electric motor, as would occur without braking electronics.

Circuit arrangements for such pulsed braking electronics have been disclosed, for example in DE-OS 3,636,555 or DE-OS 4,022,637 and do not need to be explained in more detail at this point. Instead of braking electronics operating in a pulsed manner, braking electronics which operate continuously can also be used, which ensure that the current flowing in the braking circuit is kept virtually constant. Such braking electronics have also been disclosed, for example in DE-OS 3,539,841.

Large currents flow in the motor circuit in the motor mode, especially when electric motors of relatively high power, for example more than 1200 W, are used, so that arcs can occur (cf. also FIG. 1 or 2) on the switching contacts of the two changeover switches S1, S2 when switching over from the motor mode to the braking mode.

These, arcs can cause a short-circuit to the power supply. It is particularly damaging if such an arc occurs on only one switching contact of the changeover switches S1, S2 since all the energy then flows only via this contact, it then being possible for contact erosion to occur as a result of the overloading. This eventually leads to destruction of the contacts on the changeover switches S1 and S2 and thus to premature failure of the changeover switches S1 and S2. Furthermore, there is a risk that, in the event of a power supply short-circuit, the capacitor 6 will discharge into the power supply at the connection 2, via the contact b1 and the arc which is present there. However, there is then no energy available in the field winding 1 to initiate self-excitation and braking failures can occur, in the case of which the electric motor runs on without being braked.

In order to prevent such damaging effects, the switching contacts of the two changeover switches S1, S2 are switched in a specific way according to the invention. When switching over from the motor mode to the braking mode, the two changeover switches S1, S2 initially open the motor circuit essentially synchronously in that their switching contacts are moved away from their contacts a1, a2 essentially simultaneously. The switching contact of the changeover switch S1 which is close to the power supply subsequently moves in a delayed manner with respect to the switching contact of the changeover switch S2 which is remote from the power supply, that is to say the two changeover switches S1, S2 are switched with a time delay. In consequence, the braking circuit is switched on later at the changeover switch S1 which is close to the power supply.

The high currents which flow through the motor circuit in the motor mode can result in partial welding of the switching contacts to the contacts a1, a2 on the changeover switches S1, S2. In such a case, it would then be possible for the switching contact on the changeover switch S1 or S2 respectively not to open at all and to continue to remain electrically connected as a result of the welding to the contact a1 or a2 respectively. The braking mode could then no longer be initiated. The synchronous opening of the two switching contacts when switching over from the motor mode to the braking mode now results in the full separation force being available for the switching contacts and the switching contacts invariably separating, which would not always be the case in the event of an immediate delay of the switching contact on the changeover switch S1.

The synchronous opening of the switching contacts of the changeover switches S1 and S2 preferably takes place without any delay over a path of at least 5/10mm, before the delay of the switching contact on the changeover switch S1 takes place. This reliably results in separation of the switching contacts from the contacts a1, a2 and opening of the changeover switches S1, S2 actually taking place.

If arcs occur, the synchronous opening of the two switching contacts on the changeover switches S1, S2 furthermore results in two arcs in each case being produced simultaneously, specifically one on each of the changeover switches S1 and S2. In consequence, the current which is conducted via the arcs is distributed between two switching paths and overloading of an individual contact, with the damaging consequence of contact erosion, is reliably prevented. If the two switching contacts on the changeover switches S1, S2 were not opened synchronously, then an arc would occur only on the first contact switched, and all the power would then flow via this switching path. The two contacts would then have to be dimensioned for double the switching power in each case, which would lead to both space and cost problems.

If the supply voltage is an AC voltage, the arc which occurs on the switching contacts extinguishes itself after a certain time, specifically when the phase of the power supply voltage passes through zero. It is furthermore likewise possible to arrange additional means, such as spark extinguishing chambers and the like which are known per se, on the changeover switch S1 or S2 respectively, with the aid of which means the arc is extinguished. The delay of the switching contact of the changeover switch S1 after synchronous opening thus results in the arc between the switching contact and the contact a1 of the changeover switch S1 being extinguished before the switching contact reaches the contact b1. This prevents the two contacts a1 and b1 being electrically connected by the arc which could otherwise lead to a power supply short-circuit with the possibility of the capacitor 6 discharging into the power supply. Braking failure caused by this is, in consequence, prevented.

In particular, in the case of a normal 50 Hz AC voltage as the supply voltage, a zero crossing, with the arc in consequence being extinguished, results at the latest after 10 ms. In a further embodiment of the invention, a delay time of the switching contact of the changeover switch S1 of at least 10 ms before coming to bear on the contact b1 can thus be selected.

The braking current which occurs in the braking circuit during the braking mode can likewise be very large. In this case, direct currents of 24 A or more can occur, depending on the motor power, which are not reduced to zero other than in the course of the braking mode. If the user switches from the motor mode to the braking mode and then back into the motor mode, the large braking current is frequently not yet damped and an arc can occur on the changeover switches S1 or S2, between the contacts a1, b1 or a2, b2. Such an arc can in turn lead to severe contact erosion and thus to early destruction of the changeover switches. This is particularly disadvantageous if the switching back again occurs directly after switching over from the motor mode to the braking mode since then, as a rule, the braking current has still not been significantly reduced by the braking resistor.

In order to prevent these damaging effects, the switching contacts of both changeover switches S1, S2 open essentially synchronously when switching over from the braking mode to the motor mode, so that they are moved away from the contacts b1, b2 essentially simultaneously. The two switching contacts subsequently move without any delay and thereafter switch the motor circuit on essentially simultaneously, that is to say they come to rest on the contacts a1 and a2 essentially simultaneously.

As already explained, the synchronous opening once again produces in each case one arc on both the changeover switch S1 and also S2 if arcs occur. The braking current is thus distributed between two switching paths so that none of the two changeover switches S1, S2 is excessively loaded. Destruction by contact erosion is, in consequence, prevented. However, in addition, the braking current is a direct current so that it would not be possible for self-extinguishing of the arc to take place as a result of a phase zero crossing. In this case, the arc is extinguished when the switching contact is at a specific distance from the contact b1 or b2 respectively. Both switching contacts are thus moved without any delay after opening in order to travel through as great a distance as possible in a short time and to extinguish the arcs within a very short time. In consequence, even in the extreme case when the user switches back into the motor mode again immediately after switching over from the motor mode to the braking mode, destruction of the changeover switches S1, S2 is effectively prevented.

According to the invention, the individual switching contacts of the changeover switches S1 and S2 have quite specific switching sequences. It is therefore advantageous to provide only one common operating device for both changeover switches S1 and S2, which is operated by the user in order to switch over from the motor mode to the braking mode and vice versa. The operating device then acts on a mechanism which couples the two changeover switches S1 and S2 and moves their switching contacts in accordance with the switching sequences described.

The resistor 4 is used as a braking resistor in the braking mode. When switching over from the braking mode to the motor mode, the switch S3, which is already open in the braking mode, still remains open for a certain time. In consequence, as already described, the resistor 4 is used as a series resistor in the starting phase. Once this starting phase has been completed, the switch S3 is closed so that the switch S3 is thus closed with a time delay, which is defined by the duration of the starting phase, with respect to the two changeover switches S1 and S2. In contrast, when switching over from the motor mode to the braking mode, the switch S3 is opened essentially simultaneously with the two changeover switches S1 and S2, so that the resistor 4 is immediately available as a braking resistor. As a result of this correlation of the switch S3 with the two changeover switches S1 and S2, it can be advantageous likewise to couple the switch S3 to the changeover switches S1 and S2 via a mechanism which implements this switching sequence, and to operate it by means of the common operating device.

For cost reasons, it is possible to dispense with braking electronics, particularly in the case of electric motors of relatively low power. For relatively low demands, it is then adequate to arrange an uncontrolled resistor, which takes over the current limiting function, in the braking circuit. The braking circuit according to the invention is also suitable for this purpose.

Figure 5:
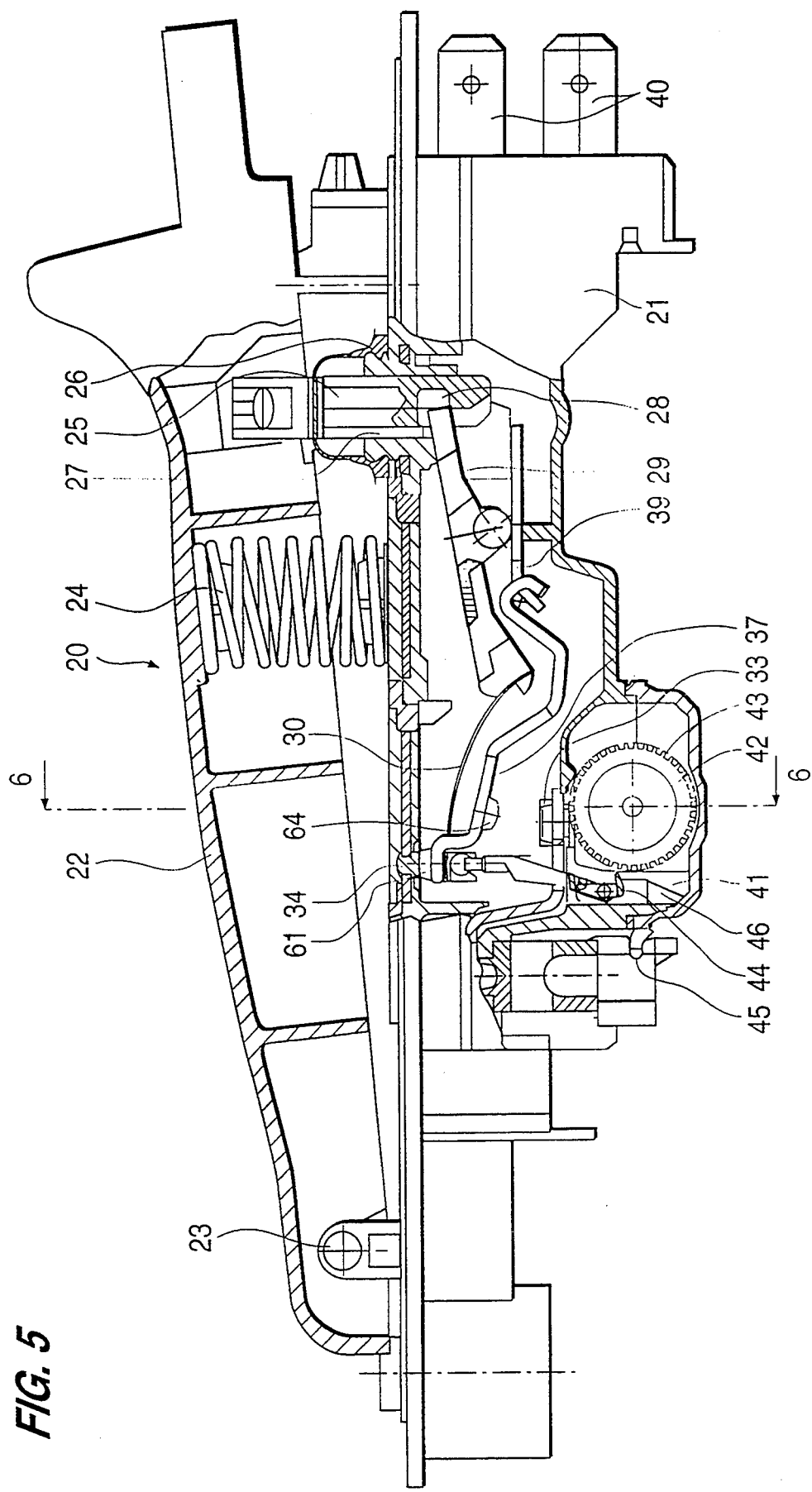
FIG. 5 shows a section through an electrical switch for use in the braking circuit.
Figure 6:
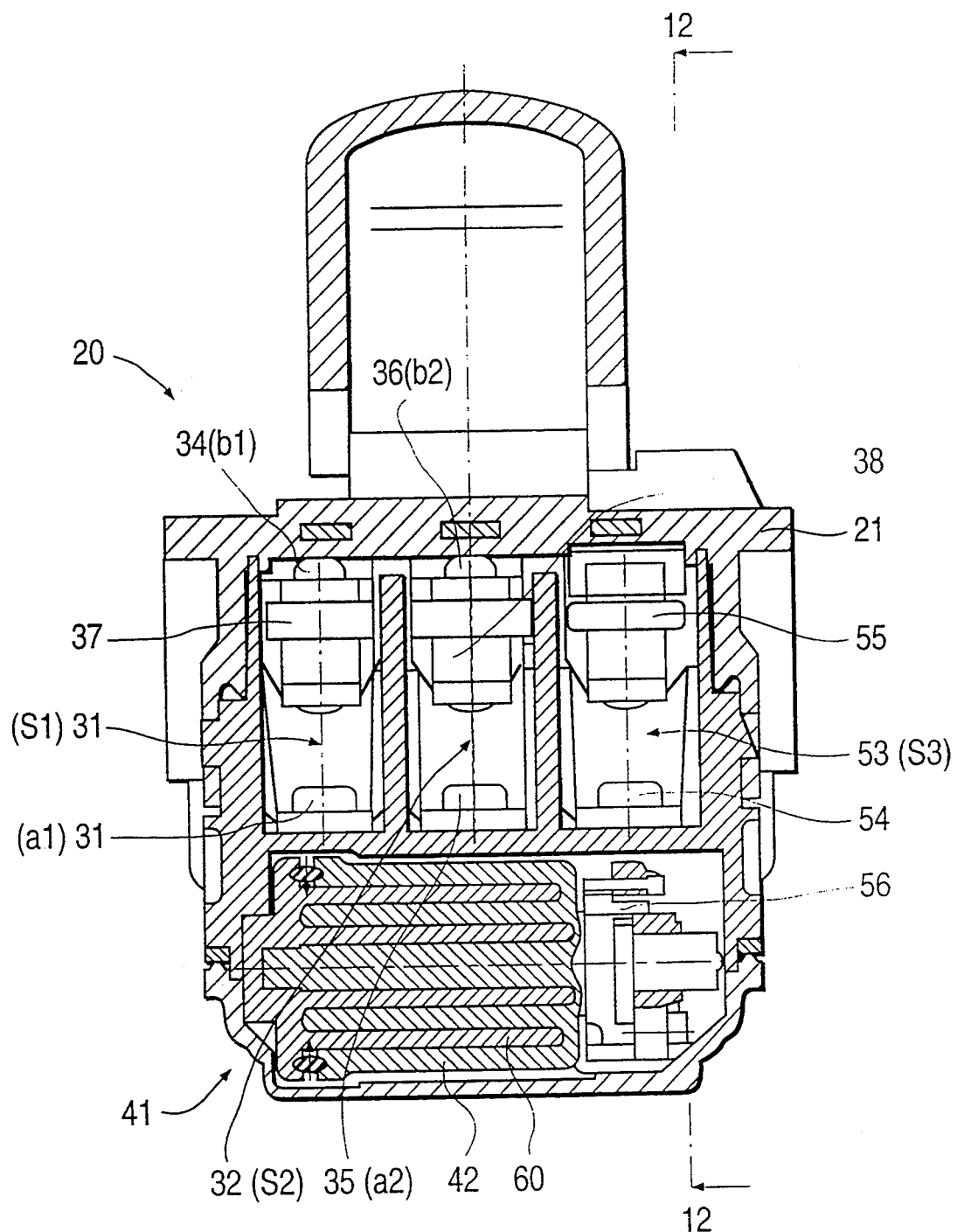
FIG. 6 shows a section along the line 6—6 in FIG. 5, FIGS. 7 to 9 show a detailed section of the electrical switch according to FIG. 5, it being possible to see the delay device in various positions during switching over from the motor mode to the braking mode.

An electrical switch 20 which is suitable for use in a braking circuit according to the invention can be seen in more detail in FIGS. 5 and 6. This switch 20 has a housing 21 in whose interior two contact systems 31, 32, which are constructed as changeover switches, are arranged with the corresponding plug contacts 40 for the electrical supply leads. In the present exemplary embodiment, the plug contacts 40 are connected to the supply leads to the electric motor in such a manner that the contact system 31 is assigned to the changeover switch S1 of the braking circuit and the contact system 32 to the changeover switch S2 (cf. also FIG. 1). The two contact systems 31, 32 each comprise a first stationary contact 33, 35 and a second stationary contact 34, 36 as well as an associated switching contact 37, 38. The switching contacts 37, 38 are connected via the associated plug contacts 40 to in each case one connection on the field winding 1 in the braking circuit according to FIG. 1. Furthermore, the electrical wiring in the switch 20 is designed such that the stationary contact 33 corresponds to the contact a1 of the changeover switch S1, and the stationary contact 34 to the contacts b1. In the case of the changeover switch S2, the contact a2 is formed by the stationary contact 35 and the contact b2 by the stationary contact 36. The switching contacts 37, 38, together with the stationary contacts 33, 35, thus represent the connection to the motor circuit and, together with the stationary contacts 34, 36, the connection to the braking circuit.

In order to switch the two switching contacts 37 and 38 respectively over between the two stationary contacts 33, 34 and 35, 36, respectively, an operating device 22 is located on the housing 21, which operating device 22 is supported by means of a journal 23 such that it can rotate against the force of a restoring spring 24. A plunger 25 which is articulated on the operating device 22 extends through an opening 27, which is sealed by means of an elastic bellows 26, into the interior of the housing 21. In the interior of the housing 21, the plunger 25 has a cutout 28 into which a first lever arm of a rocker 29, which is supported in the interior of the housing 21 such that it can rotate, engages. One end of a leaf spring 30, which is prestressed, is clamped in on the second lever arm of the rocker 29 as the spring element for each switching contact 37, 38, the other end of the leaf spring 30 being attached to the switching contact 37, 38 in the vicinity of the contact surface 61. On the side opposite the contact surface 61, the switching contact 37, 38 is supported in a knife-edge bearing 39 which is located in the interior of the housing 21.

When the operating device 22 is in the unoperated state, the contact surface 61 of the switching contact 37, 38 rests against the stationary contacts 34, 36, by means of which the connections to the braking circuit are produced and the connection of the electric motor to the supply voltage is disconnected. If the user operates the operating device 22, then the rocker 29 is pivoted via the plunger 25. At the same time, the leaf springs 30 of the two switching contacts 37, 38 are deformed. As a result of the symmetrical arrangement of the two leaf springs 30 on a common rocker 29, the contact surfaces 61 of the two switching contacts 37, 38 are lifted off the stationary contacts 34, 36 essentially synchronously at a specific deformation, the lifting-off occurring suddenly as a result of the spring force. In contrast, the further contact surfaces 64 of the switching contacts 37, 38 are likewise lifted off the stationary contacts 33, 35 essentially synchronously and suddenly when the operating device 22 is released and once again returns to its unoperated state.

According to the invention, the contact system 31 which is assigned to the changeover switch S1 is now provided with a delay device 41 with the aid of which the movement of the switching contact 37 is delayed, once the contact surface 64 has lifted off the first stationary contact 33, during switching over from the motor mode to the braking mode, so that the contact surface 61 on the switching contact 37 comes to rest on the second stationary contact 34 later than the corresponding contact surface 61 of the switching contact 38 of the further contact system 32 comes to rest on the second stationary contact 36. In the case of the opposite switching direction, specifically during switching over from the braking mode to the motor mode, this delay device 41 is ineffective or is at most insignificantly effective, so that, during switching over from the second stationary contact 34 to the first stationary contact 33, the switching contact 37 experiences no significant delay. The switching contact 38 of the other contact system 32, which is assigned to the changeover switch S2, moves in both changeover directions, that is to say both from the first stationary contact 35 to the second stationary contact 36 and vice versa without any delay, to be precise, as a result of the spring force of the leaf spring 30, with a snap-action effect.

The more detailed construction of the delay device 41 can likewise be seen in FIGS. 5 and 6. The delay device 41 comprises a means which is connected to the switching contact 37 and permits positively-locking engagement in a movement-constraining element during switching over from the first stationary contact 33 to the second stationary contact 34.

This means comprises a switching lever 45, one side of which is articulated on the switching contact 37. On its other side, the switching lever 45 has a latching element 44. The movement-constraining element primarily comprises a cylindrical drum 42 which is supported in the housing 21 so that it can rotate and in which, as can be seen especially in FIG. 6, a further inner drum 60 is arranged. The drum 42 can move with respect to the inner drum 60. A viscous fluid, for example a silicone oil with a suitably selected viscosity, is located in the interior of the drum 42, between the drum 42 and the inner drum 60. In consequence, the rotational movement of the drum 42 is damped by means of viscous fluid. A tooth system 43 (see FIG. 5) into which the latching element 44 which is located on the switching lever 45 can engage is arranged on the envelope surface of this drum 42, on the side facing the contact system 31. This engagement of the latching element 44 in the tooth system 43 is produced by a link 46 which is arranged in the housing 21 and along which the switching lever 45 is guided while the switching contact 37 is being switched over between the two stationary contacts 33, 34. For this purpose, a spring element 47, which can be seen in more detail in FIG. 7, on the switching lever 45 applies to such switching lever 45 a force which is directed for guidance of the link 46.

Figure 7:
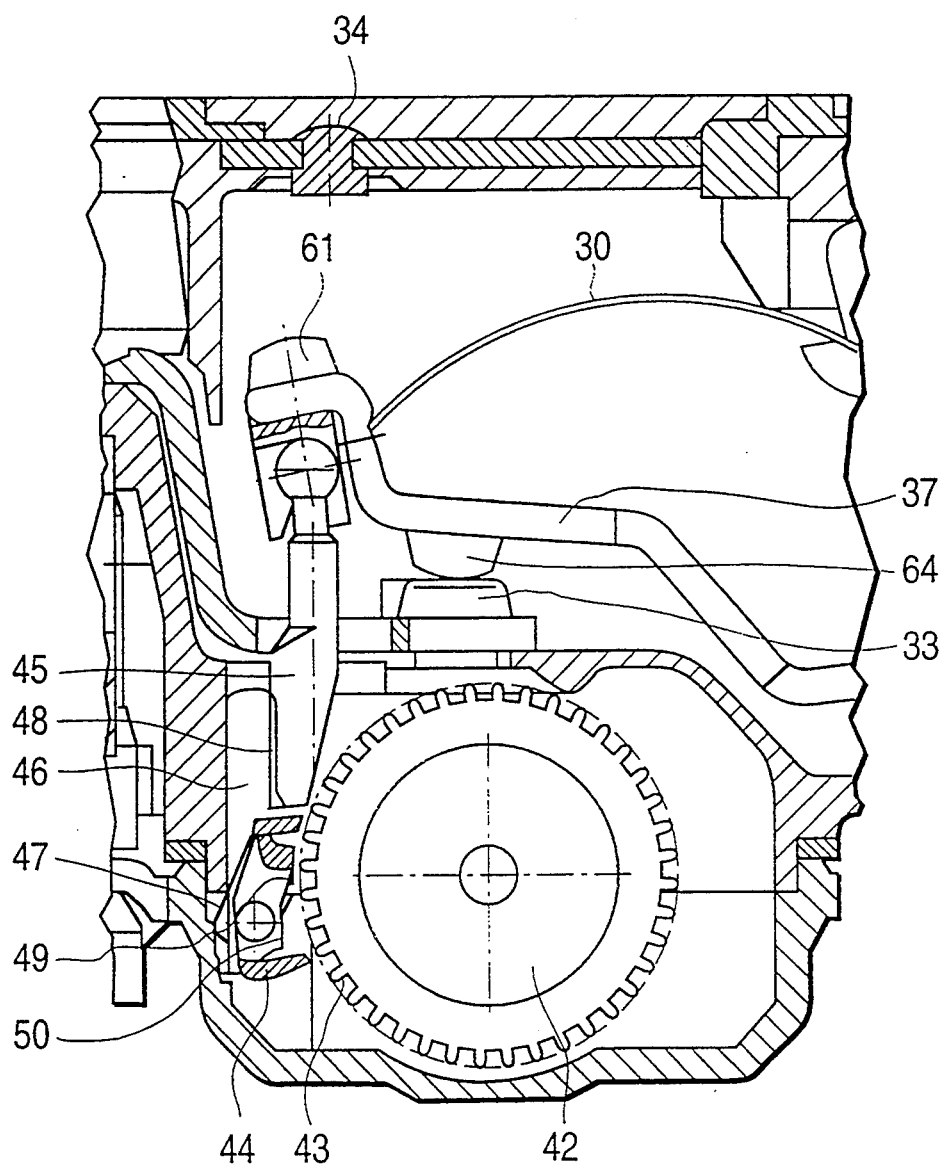
Figure 8:
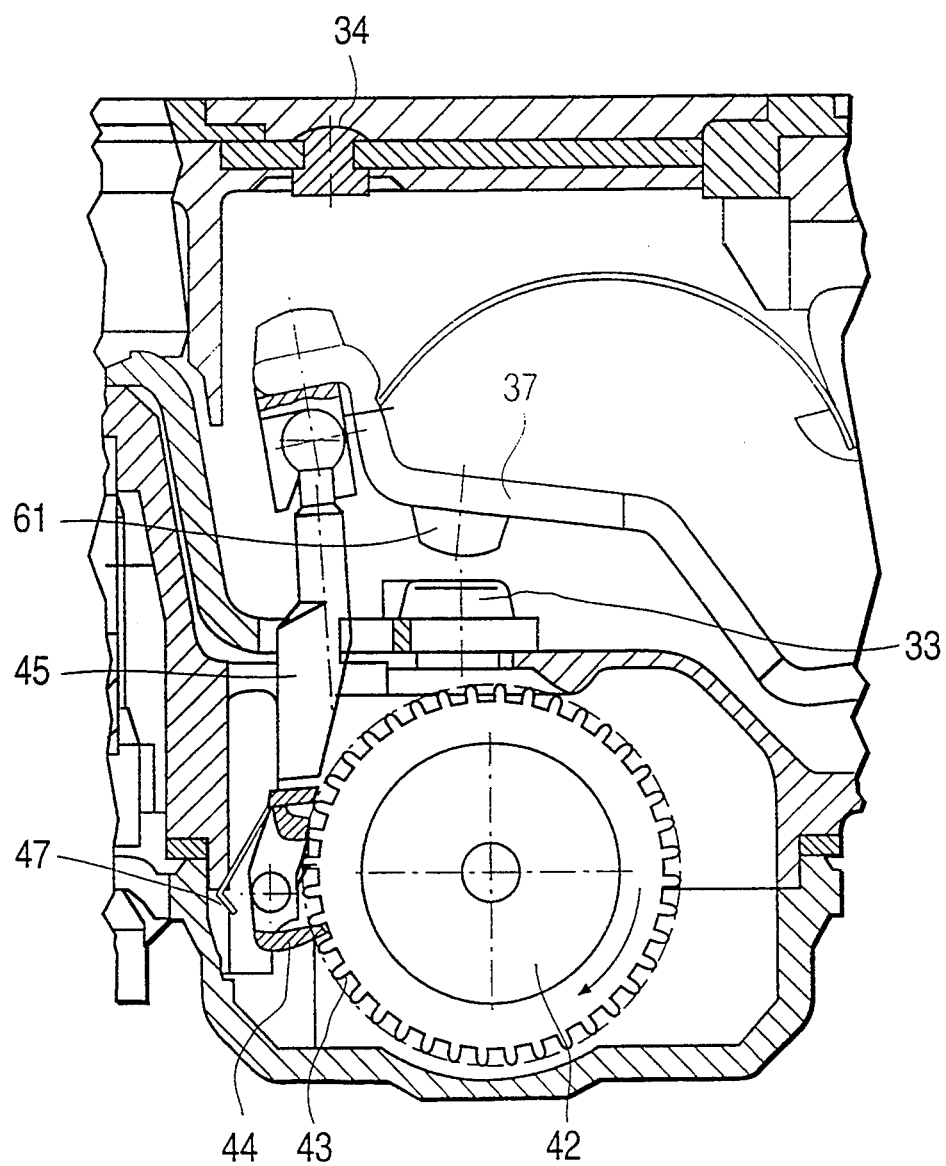
Figure 9:
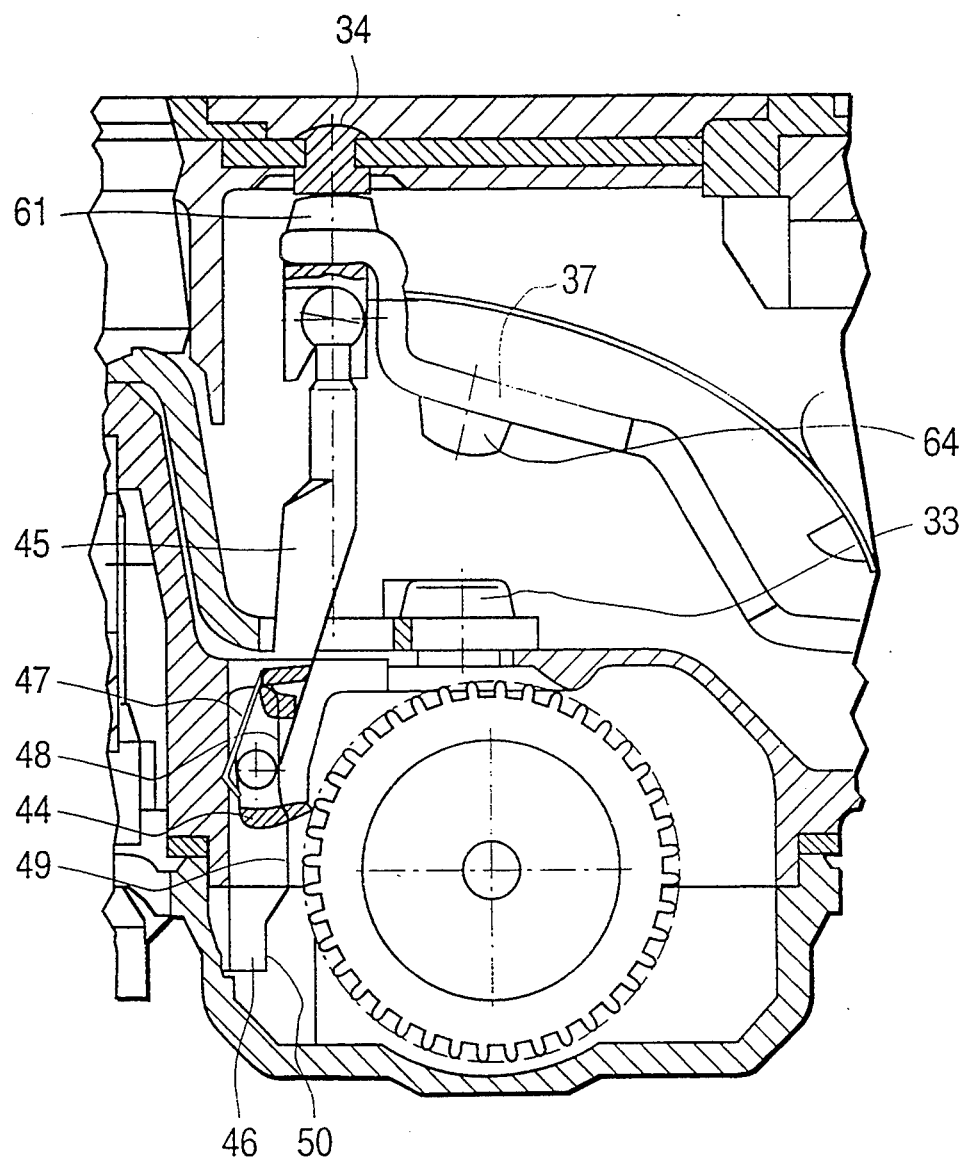

The method of operation of the delay device 41 during switching over from the first stationary contact 33 to the second stationary contact 34 can be seen in more detail in FIGS. 7 to 9.

In FIG. 7, the contact surface t54 of the switching contact 37 is still resting against the first stationary contact 33, and the motor mode of the electric motor is thus switched on. The switching lever 45 is resting against the lower recessed surface 50 of the link 46 so that the latching element 44 is not engaged with the tooth system 43. If the user now releases the operating device 22 (see FIG. 5), in order to switch the electric motor off and hence to switch over from the motor mode to the braking mode, then the switching contact 37 lifts off the stationary contact 33 as a result of the spring force of the leaf spring 30, the motor circuit being opened. In this case, the switching lever 45, which is articulated on the switching contact 37, is also moved simultaneously. During this movement, the switching lever 45.is guided along the link 46 as a result of the force of the spring element 47 and moves from the lower recessed surface 50 to the central prominent surface 49. There, the latching element 44 also engages with the tooth system 43 on the drum 42, as can be seen in FIG. 8. As a result of the damping of the drum 42, the further movement of the-switching lever 45 is constrained and thus the changeover movement of the switching contact 37 is also delayed as long as the switching lever 45 is sliding along the central prominent surface 49 of the link 46. On the transition from the central prominent surface 49 to the upper recessed surface 48 of the link 46, the latching element 44 disengages again from the tooth system 43, as can be seen in FIG. 9. In this position, the contact surface 61 on the switching contact 37 comes to rest against the second stationary contact 34, by means of which the braking circuit and hence the braking mode of the electric motor are switched on.

The link 46 is preferably constructed by means of suitable dimensioning of the lower recessed surface 50 such that the contact surface 64 of the switching contact 37 lifts off the first stationary contact 33 through a distance of approximately 5/10 mm without any delay. Furthermore, the drum 42 and the central prominent surface 49 are dimensioned such that the contact surface 61 of the switching contact 37 comes to rest against the stationary contact 34 with a delay time of at least 10 ms. The desired delay time can also furthermore be adjusted by suitable selection of the viscosity of the fluid which is contained in the drum 42.

Figure 10:
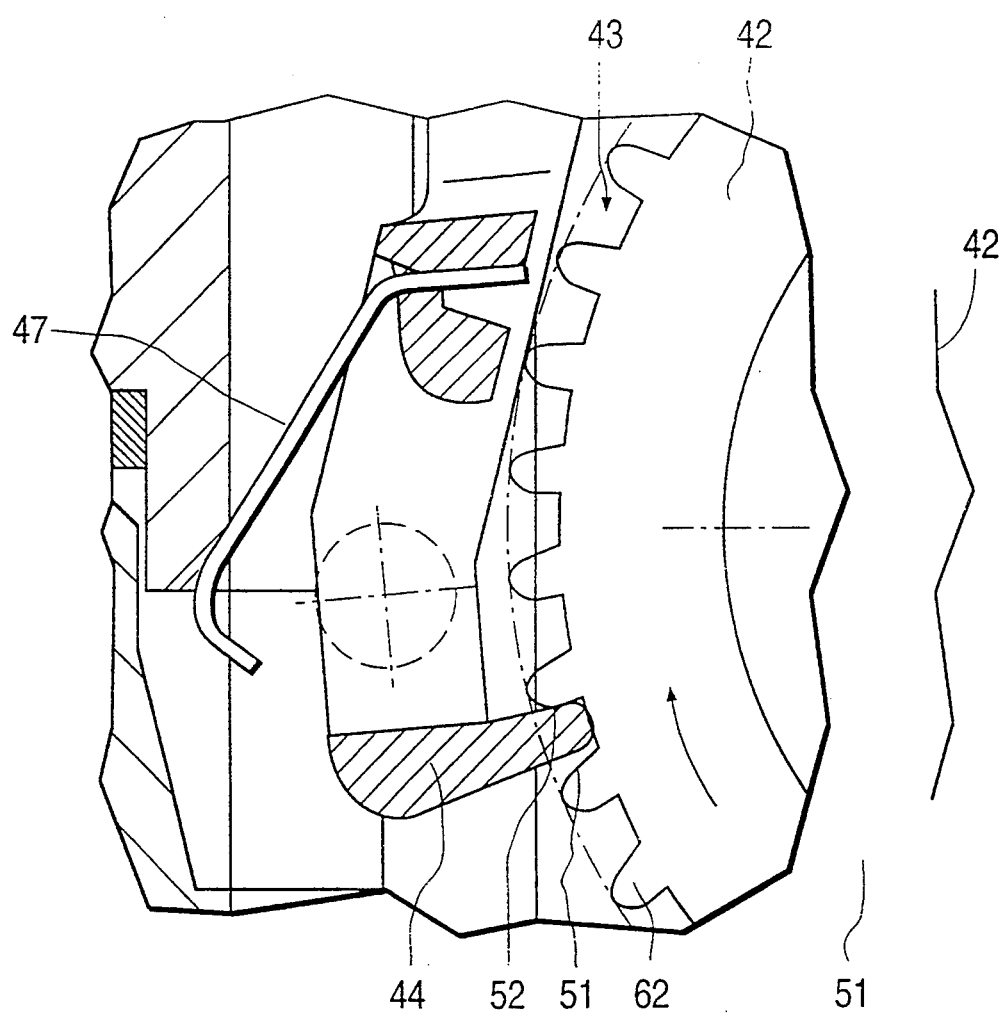
FIG. 10 shows a detailed section of the delay device according to FIG. 8 in an enlarged representation during switching over from the motor mode to the braking mode.

During the switching over of the switching contact 37 from the second stationary contact 34 to the first Stationary contact 33, that is to say during the switching on of the electric motor or during switching over from the braking mode to the motor mode, the latching element 44 is not engaged, or is at most insignificantly engaged, in the tooth system 43 of the drum 42, so that no significant delay of the switching contact 37 occurs. This is achieved by the tooth system 43 on the drum 42 being constructed in a such a manner that, as a result of the interaction of the tooth system 43 and the latching element 44, a force component which points in the direction from the tooth system 43 acts on the latching element 44 during the movement of the switching contact 37 with the articulated switching lever 45 towards the first stationary contact 33. For this purpose, the teeth 62 of the tooth system 43 have two edges of different shape, namely an inclined edge 51 and a steep edge 52, as can be seen particularly clearly in FIG. 10 or 11.

Figure 11:
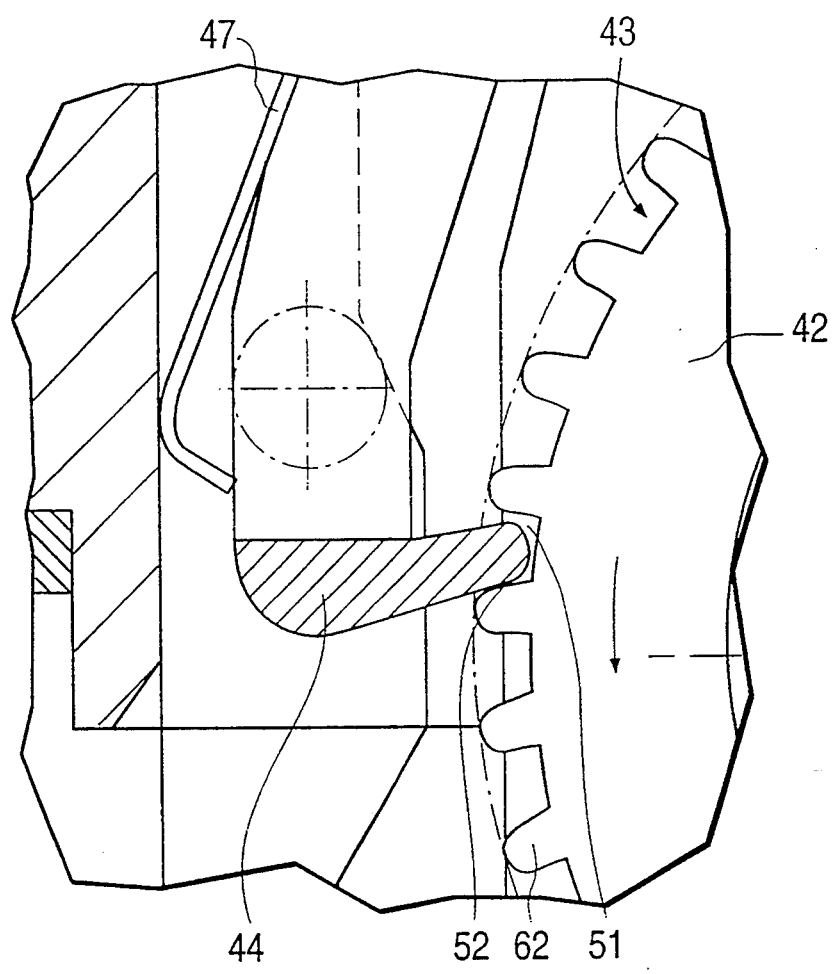
FIG. 11 shows a detailed section of the delay device in an enlarged representation as in FIG. 10, during switching over from the braking mode to the motor mode.
Figure 12:
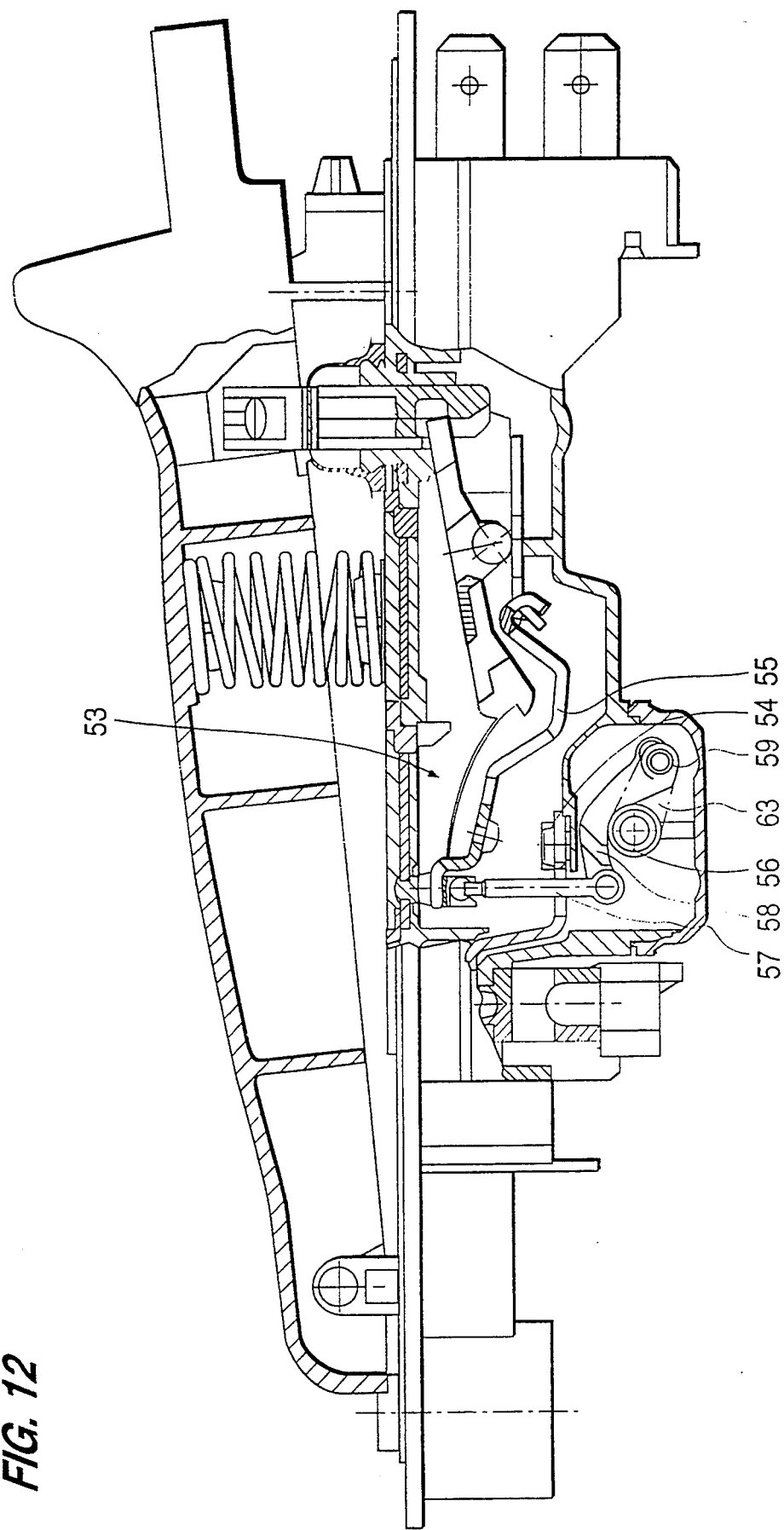
FIG. 12 shows a section along the line 12—12 in FIG. 6.

During the movement of the switching lever 45 along the upper recessed surface 48 of the .link 46, the latching element 44 is initially moved into the tooth system 43 again on reaching the central prominent surface 49 of the link 46, as a result of the force of the spring element 47, and, at the same time, the drum 42 is caused to rotate in the counter-clockwise direction. Since the switching over movement from the second stationary contact 34 to the first stationary contact 33 is taking place, the .inclined edge 51 now interacts with the latching element 44, as is shown in FIG. 11, a force component pointing out of the tooth system 43 being produced as a result of the angle between the latching element 44 and the inclined edge 51. As a result of this force component, the switching lever 45 is removed, against the force of the spring element 47, from the central prominent surface 49 of the link 46, and the latching element 44 disengages from the tooth system 43. The switching lever 45, in consequence, moves essentially without any delay, together with the switching contact 37, onto the first stationary contact 33, renewed engagement of the latching element 44 in the tooth system 43 no longer occurring, as a result of the rotational movement of the drum 42 during this movement.

This effect can be further reinforced by the prestressing of the leaf spring 30 being selected such that a larger spring force acts during switching over from the second stationary contact 34 to the first stationary contact 33 than in the opposite movement direction. In consequence, engagement of the latching element 44 in the tooth system 43 when switching over from the braking mode to the motor mode is additionally prevented, as a result of the higher movement speed of the switching contact 37 with the articulated switching lever 45. A spring force which is approximately 5 times as great in the switching over direction from the braking mode to the motor mode than in the reverse direction has been found to be particularly suitable.

In contrast, however, engagement of the latching element 44 in the tooth system 43, and hence the already described delay, are ensured when switching over from the motor mode to the braking mode. As can be seen from FIG. 10, the drum 42 is moved in the clockwise direction by the switching lever 45, the steep edge 52 resting essentially parallel against the latching element 44. There is thus no force component pointing out of the tooth system 43 and the force which is exerted by the latching element 44 on the tooth system 43 rather acts essentially parallel to the movement direction of the switching lever 45, so that the spring element 47 assists the engagement of the latching element 44 in the tooth system 43. This force which is exerted by the latching element 44 on the tooth system 43, in the movement direction of the switching lever 45 counteracts a force which is produced by the movement constraint of the drum 42, of course, so that the movement of the switching lever 45 is delayed.

As has already been explained with reference to FIG. 1, a further switch S3 can also be arranged in the braking circuit in order to bridge a resistor 4 which acts as a series resistor and braking resistor. It can now be advantageous likewise to integrate this switch S3 in,the electrical switch 20.

The switch S3, which is constructed as a normally-open contact, is arranged as a further contact system 53 in the housing 21 of the electrical switch 20, as can be seen especially in FIG. 6. The contact system 53 has only one stationary contact 54 and one switching contact 55. In the braking mode, the switching contact 55 is lifted off the stationary contact 54 and the contact system 53 is thus opened. If a changeover is made from the braking mode to the motor mode via the operating device 22, and the electric motor is thus switched on, the movement of the switching contact 55 is thus constrained by means of a delay device. While the two switching contacts 37 and 38 respectively, which switch on the motor circuit, are switching without a delay from the second stationary contact 34 or 36 respectively to the first stationary contact 33 or 35 respectively, the switching contact 55 does not come to rest against the stationary contact 54 until a suitably selected delay time has elapsed, within which the starting phase for the electric motor has been completed, as a result of which the resistor 4 is bridged (see FIG. 1). In contrast, when switching over from the motor mode to the braking mode, the switching contact 55 is lifted off the stationary contact 54 without any delay, and the contact system 53 is thus opened without any delay.

The movement-constraining element, which already exists for the contact system 31, can also be used in an advantageous manner as a delay device for the further contact system 53. For this purpose, the drum 42 likewise has a tooth system 56 in the region of the contact system 53, in which tooth system 56 means which are arranged on the switching contact 55 engage in a positively-locking manner during movement of the switching contact 55 in the direction of the stationary contact 54, as is shown further with reference to FIG. 11. These means comprise a lever 57, which is articulated on the switching contact 55 and is in turn connected in an articulated manner to a latching lever 58 which has latching teeth 59. The latching lever 58 is furthermore arranged in an articulated manner on a connecting lever 63 which is supported such that it can rotate on the axis of the drum 42. When switching over from the=braking mode to the motor mode, the latching teeth 59 of the latching lever 58 are engaged with the tooth system 56, via the lever 57, as a result of the movement of the switching contact 55, as a result of which the movement of the switching contact 55 is delayed in accordance with the principle already described. When switching over from the motor mode to the braking mode, the latching lever 58 is suddenly lifted off the drum 42 via the lever 57, so that the latching teeth 59 on the latching lever 58 immediately disengage from the tooth system 56, in consequence there also being no delay in the opening of the contact system 53.

In the present exemplary embodiment, a delay device 41 is described which comprises a drum 42, which is damped by means of a fluid, and a switching lever 45. The context of the invention also covers the use of delay devices based on different operating principles on an electrical switch which is suitable for the braking circuit. For example, the delay device can also operate by means of a piston/cylinder arrangement, damping being achieved pneumatically by means of gas pressure.

We claim:

1. A braking circuit for an electric motor having an armature winding and a field winding, the field winding having a first terminal for connection to a power supply terminal, and a second terminal, said braking circuit comprising:

braking means having first and second connections for being connected in a circuit for braking the electric motor;

a braking switch including first and second changeover switches for switching between a motor mode and a braking mode, said first changeover switch including a first stationary contact connected to the power supply terminal, a second stationary contact coupled to the first connection of the braking circuit and a switching contact connected to the first terminal of said field winding and being switchable between the first and second stationary contacts of said first changeover switch, said second changeover switch including a first stationary contact coupled to the armature, a second stationary contact connected to the second connection of the braking circuit and a switching contact connected to the second terminal of the field winding and being switchable between the first and second stationary contacts of the second changeover switch, the switching contacts of the first and second changeover switches being switched between (1) a first position for contacting, respectively, the first stationary contacts of the first and second changeover switches in the motor mode for connecting the field winding and the armature in series with the power supply terminal to form a motor circuit, and (2) a second position for contacting, respectively, the second stationary contacts of the first and second changeover switches in the braking mode for connecting the field winding and the armature winding in the circuit with the braking means to form a closed braking circuit; and control means coupled to the first and second changeover switches for controlling the switching between the motor mode to the braking mode so that when the braking switch switches from the motor mode to the braking mode, the switching of the first changeover switch from its first position to its second position is delayed with respect to the switching of the second changeover switch from its first position to its second position for switching on the braking circuit later upon the switching of the first changeover switch to its second position, and when the braking switch switches from the braking mode to the motor mode, the first and second changeover switches both switch from their second position to their first position substantially synchronously for switching the motor circuit on essentially simultaneously.

2. The braking circuit as claimed in claim 1, wherein the first and second changeover switches both switch, respectively, from their first positions to their second positions essentially synchronously when switching from the motor mode to the braking mode, the switching contact of the first changeover switch moving from 5 to 10 mm without any delay and subsequently moving in a delayed manner.

3. The braking circuit as claimed in claim 2, wherein the switching contact of the second changeover switch moves without a delay when switching from the motor mode to the braking mode.

4. The braking circuit as claimed in claim 1, wherein a supply voltage of the power supply is an AC voltage and the switching contact of the first changeover switch moves in a delayed manner when switching from the motor mode to the braking mode, an arc occurring when the first changeover switch moves is extinguished by a zero crossing of the AC voltage of the supply voltage before the switching contact of the first changeover switch reaches the second stationary contact of the first changeover switch.

5. The braking circuit as claimed in claim 4, wherein the switching contact of the first changeover switch is delayed by at least 10 ms before the switching contact comes to rest against the second stationary contact of the first changeover switch when switching from the motor mode to the braking mode.

6. The braking circuit as claimed in claim 1, further comprising a common operating device coupled to the first and second changeover switches, the common operating device acting on the first and second changeover switches and moving the switching contacts of the first and second changeover switches, respectively, in a switching sequence.

7. The braking circuit as claimed in claim 1, further comprising a resistor connected between the second changeover switch and the armature winding when the braking switch is in the motor mode, the resistor further being connected to first and second diodes so that the resistor is a braking resistor when the braking switch is in the braking mode.

8. The braking circuit as claimed in claim 7, wherein the resistor has a first terminal and a second terminal, the first terminal of the resistor being connected to the second stationary contact of the second changeover switch and the second terminal of the resistor being connected to the armature winding of the electric motor, an anode of the first diode being connected to the second stationary contact of the second changeover switch, and an anode of the second diode being connected to the second terminal of the resistor.

9. The braking circuit as claimed in claim 8, further comprising a third switch arranged in parallel with the resistor and which bridges the resistor when the third switch is in a closed state.

10. The braking circuit as claimed in claim 9, wherein when the braking switch switches from the motor mode to the braking mode, a switching contact of the third switch opens without a delay and essentially simultaneously with the first and second changeover switches and, when the braking switch switches from the braking mode to the motor mode, the switching contact of the third switch closes without a delay with respect to a switching operation of the first and second changeover switches.

11. The braking circuit as claimed in claim 10, further comprising a mechanism coupled to the third switch and the first and second changeover switches for implementing a switching sequence, and a common operating device for acting on the first and second changeover switches and the third switch via the mechanism.

12. The braking circuit as claimed in claim 1, wherein the braking means comprises braking electronics coupled to the braking circuit for controlling a braking current.

13. The braking circuit as claimed in claim 12, further comprising a first diode having an anode and a cathode, the first diode being arranged between the braking electronics and the armature winding, the anode of the first diode being connected to the braking electronics.

14. The braking circuit as claimed in claim 1, further comprising a capacitor connected in parallel with the armature winding.

15. The braking circuit as claimed in claim 14, further comprising a second diode having an anode and a cathode, and wherein the capacitor is connected between the anode of the first diode and the cathode of the second diode.

* * * * *